United States Patent
Itoi et al.

[11] Patent Number: 6,029,265
[45] Date of Patent: Feb. 22, 2000

[54] ERROR CONTROL DEVICE

[75] Inventors: Satoshi Itoi; Shigeru Araki, both of Tokyo, Japan

[73] Assignee: NEC Corporation, Japan

[21] Appl. No.: 08/947,569

[22] Filed: Oct. 9, 1997

[30] Foreign Application Priority Data

Oct. 11, 1996 [JP] Japan ................................. 8-289176

[51] Int. Cl.$^7$ ................................. H03M 13/00
[52] U.S. Cl. ................. 714/755; 714/769; 714/779
[58] Field of Search ..................... 714/779, 776, 714/755, 769

[56] References Cited

U.S. PATENT DOCUMENTS

| | | | |
|---|---|---|---|
| 5,455,629 | 10/1995 | Sun et al. ................. | 348/466 |
| 5,550,640 | 8/1996 | Tsuboi et al. ............. | 358/355 |
| 5,636,316 | 6/1997 | Oku et al. ................. | 386/112 |
| 5,771,081 | 6/1998 | Lee ........................... | 348/845.1 |
| 5,771,239 | 6/1998 | Moroney et al. .......... | 370/474 |
| 5,903,324 | 5/1999 | Lyons et al. .............. | 348/845.3 |

FOREIGN PATENT DOCUMENTS

| | | |
|---|---|---|
| 59-180810 | of 1984 | Japan . |
| 63-200238 | of 1988 | Japan . |
| 4212584 | of 1992 | Japan . |
| 4252666 | of 1992 | Japan . |
| 6501346 | of 1994 | Japan . |

OTHER PUBLICATIONS

Confidential Information, "Compact Disc", Sony Corp. and N.V. Philips, Jun. 7, 1984.

Office Action Issued by the Japanese Patent Office on Feb. 23, 1999 in the Corresponding Japanese Application and an English Translation Thereof.

*Primary Examiner*—Stephen M. Baker
*Attorney, Agent, or Firm*—Ostrolenk, Faber, Gerb & Soffen, LLP

[57] ABSTRACT

An error control device includes an error detection code generating section and an error detection section. The error code generating section is arranged in a recording system to generate and add an error detection code to variable-length data. The error detection section is arranged in a reproducing system to perform error detection for reproduced variable-length data on the basis of the error detection code added thereto.

18 Claims, 18 Drawing Sheets

| |
|---|
| 0 0 |
| 0 1 |
| 1 0 0 |
| 1 0 1 |
| 1 1 0 0 |
| 1 1 0 1 |
| 1 1 1 0 |
| 1 1 1 1 0 |
| 1 1 1 1 1 |

| SLICE No. | MB No. 0 | 1 | 2 | 3 |  |  |  |
|---|---|---|---|---|---|---|---|
| 0 | 100 | 1101 | 11111 | 01 | "14" | CRCC | |
| 1 | 10 | 101 | 1101 | 1100? | "15" | CRCC | |
| 2 | 00 | 101 | 00 | CRCC | "17" | CRCC | |
| 3 | 1100 | 1101 | 11111 | 100 | | | |
| 4 | 101 | 1101 | 100 | 11110 | 01 | 100 | |
| NUMBER OF BITS | "16" | "20" | "18" | "10" | "14" | "12" | |
| CRCC | CRCC | CRCC | CRCC | CRCC | CRCC | EXTENDED CRCC | |
| | | | | | | EXTENDED CRCC | |

| SLICE No. | | | | | | |
|---|---|---|---|---|---|---|
| 0 | MB0 | MB1 | MB2 | MB3 | SYMBOL | RS |
| 1 | MB0 | MB1 | MB2 | MB3 | SYMBOL | RS |
| 2 | MB0 | MB1 | MB2 | SYMBOL | | RS |
| 3 | MB0 | MB1 | MB2 | MB3 | SYMBOL | RS |
| 4 | MB0 | MB1 | MB2 | MB3 | SYMBOL | RS |
| 5 | MB0 | MB1 | MB2 | MB3 | SYMBOL | RS |
| 6 | MB0 | MB1 | MB2 | MB3 | | RS |
| 7 | MB0 | MB1 | MB2 | MB3 | SYMBOL | RS |
| 8 | MB0 | MB1 | MB2 | MB3 | SYMBOL | RS |
| 9 | MB0 | MB1 | MB2 | MB3 | SYMBOL | RS |
| NUMBER OF SYMBOLS | NUMBER OF SYMBOLS OF MB 0 | NUMBER OF SYMBOLS OF MB 1 | NUMBER OF SYMBOLS OF MB 2 | NUMBER OF SYMBOLS OF MB 3 | EXTENDED RS | |
| RS | MB0 RS | MB1 RS | MB2 RS | MB3 RS | EXTENDED RS | |

FIG. 12

| SLICE No. | MB No. 0 | 1 | 2 | 3 | | | |
|---|---|---|---|---|---|---|---|
| 0 | 100 | | 11111 | 01 | | | |
| 1 | 1110 | 1110 | 101 | 1100 | | | |
| 2 | 00 | 101 | | | RS | | |
| 3 | 1100 | 11111 | | | 1100 | RS | |
| 4 | 101 | 1101 | | | | | |
| NUMBER OF SYMBOLS | "8" | "10" | "9" | "6" | "7" | "8" | "9" |
| RS | RS | RS | RS | RS | (0) | (0) | (0) |
| | | | | EXTENDED RS | EXTENDED RS | | |

| SLICE No. | MB No. 0 | 1 | 2 | 3 | | | |
|---|---|---|---|---|---|---|---|
| 0 | 100 | 1101 | 11111 | 01 | "7" | RS | |
| 1 | 10 | 101 | 1101 | 11110 | "8" | ⟨0⟩ | RS |
| 2 | 00 | 101 | 00 | 100 | 5 | 0? | RS |
| 3 | 1100 | | 11111 | 100 | 11110 | "6" | ⟨0⟩ "9" RS |
| 4 | 101 | 1101 | 100 | 01 | "7" | RS | |
| NUMBER OF SYMBOLS | "8" | "10" | "9" | | | EXTENDED RS | |
| RS | RS | RS | RS | RS | | EXTENDED RS | |

| SLICE No. | | |
|---|---|---|
| 0 | SLICE 0 | CRCC |
| 1 | SLICE 1 | CRCC |
| 2 | SLICE 2 | CRCC |
| 3 | SLICE 3 | CRCC |
| 4 | SLICE 4 | CRCC |
| 5 | SLICE 5 / SLICE 6 | CRCC |
| 6 | SLICE 7 | CRCC |
| 7 | SLICE 8 / SLICE 9 | CRCC |

ERROR CONTROL DEVICE

BACKGROUND OF THE INVENTION

The present invention relates to an error control system and, more particularly, to an error control device suitably used for digital recording optical disks (including magnetooptical disks and phase change disks), digital recording hard disks, digital recording VTRs (Video Tape Recorders), and the like.

In conventional digital recording disk apparatuses, digital recording VTRS, and the like, error correction codes and error detection codes are used. They are all fixed-length codes. For example, in a CD (Compact Disk), 4-byte Reed-Solomon codes are added to an internal code in units of 28-byte data, and 4-byte Reed-Solomon codes are added to an external code in units of 24-byte data.

In a DVC (Digital Video Cassette) for a digital VTR, 8-byte Reed-Solomon codes are added to an internal code in units of 77-byte data, and 11-byte Reed-Solomon codes are added to an external code in units of 138-byte data.

In the optical disk recorder (VF-200) developed by the present applicant, 16-byte Reed-Solomon codes are added to an internal code in units of 174-byte data, and 8-byte Reed-Solomon code codes are added to an external code in units of 128-byte data.

These codes are all fixed-length codes whose data consists of predetermined numbers of bytes. Similarly, error detection codes such as CRCCs are all fixed-length codes whose data consists of predetermined numbers of bits.

Since the above CD, DVC, and optical disk recorder (VF-200) handle fixed-length data as non-compressed video/speech signals, fixed-length codes are suitably used.

In recording apparatuses handling compressed video/speech signals, since variable-length data is used, fixed-length codes may pose a problem in terms of compatibility.

Assume that a 1-frame video signal is constituted by 720 (pixel)×480 (line); one block, 8 (pixel)×8 (line); one macroblock, a 4-block Y signal, i.e., 16 (pixel)×16 (line); and one slice, 45 macroblocks in the horizontal direction, i.e., 720 (pixel)×16 (line).

FIG. 18 shows an example of how CRCC (Cyclic Redundancy Check Code) error detection codes are added to variable-length codes. FIG. 14 shows an example of the arrangement of a known CRCC register. Referring to FIG. 14, reference numeral 1 denotes a delay element; and 2, an adder.

As shown in FIG. 18, the code amount of 1-slice data after compression changes. For example, the code amount changes to 400 bits or 250 bits. In such a case, if fixed-length error correction and detection codes are used, an error correction code sequence or an error detection code sequence cannot be matched with a slice. As a result, an error in a given sequence propagates to the next slice, and the efficiency of correction/detection processing deteriorates. If, however, variable-length codes can be used, an error correction code sequence or an error detection code sequence can be matched with a slice, the efficiency of correction/detection processing improves.

SUMMARY OF THE INVENTION

It is an object of the present invention to provide an error control device which can efficiently perform error detection/correction for variable-length data.

In order to achieve the above object, according to the present invention, there is provided an error control device comprising error detection code generating means, arranged in a recording system, for generating and adding an error detection code to variable-length data, and error detection means, arranged in a reproducing system, for performing error detection for reproduced variable-length data on the basis of the error detection code added thereto.

BRIEF DESCRIPTION OF THE DRAWINGS

FIG. 5 is a view showing variable-length codes in the present invention;

FIG. 6 is a view showing macroblock variable-length codes corresponding to the respective slice numbers (slice Nos.) and the respective intra-slice macroblock numbers (MB Nos.) in the present invention;

FIG. 7 is a view showing a case in which an error has occurred at the second bit of MB 0 of slice 1 in the present invention;

FIG. 9 is a view showing how a slice symbol count and an error correction code are added to each variable-length slice in the present invention;

FIG. 11 is a view showing how data symbol counts and error correction codes are added in units of variable-length slices in the vertical and horizontal directions in the present invention;

FIG. 12 showing macroblock variable-length codes corresponding to the respective slice numbers (slice Nos.) and the respective intra-slice macroblock numbers (MB Nos.) in the present invention;

FIG. 13 is a view showing a case in which errors have occurred at the second and tenth bits of slice 1 in the present invention;

FIG. 18 is a view showing a conventional CRCC adding method.

DESCRIPTION OF THE PREFERRED EMBODIMENTS

The present invention will be described in detail below with reference to the accompanying drawings.

Figure 1:
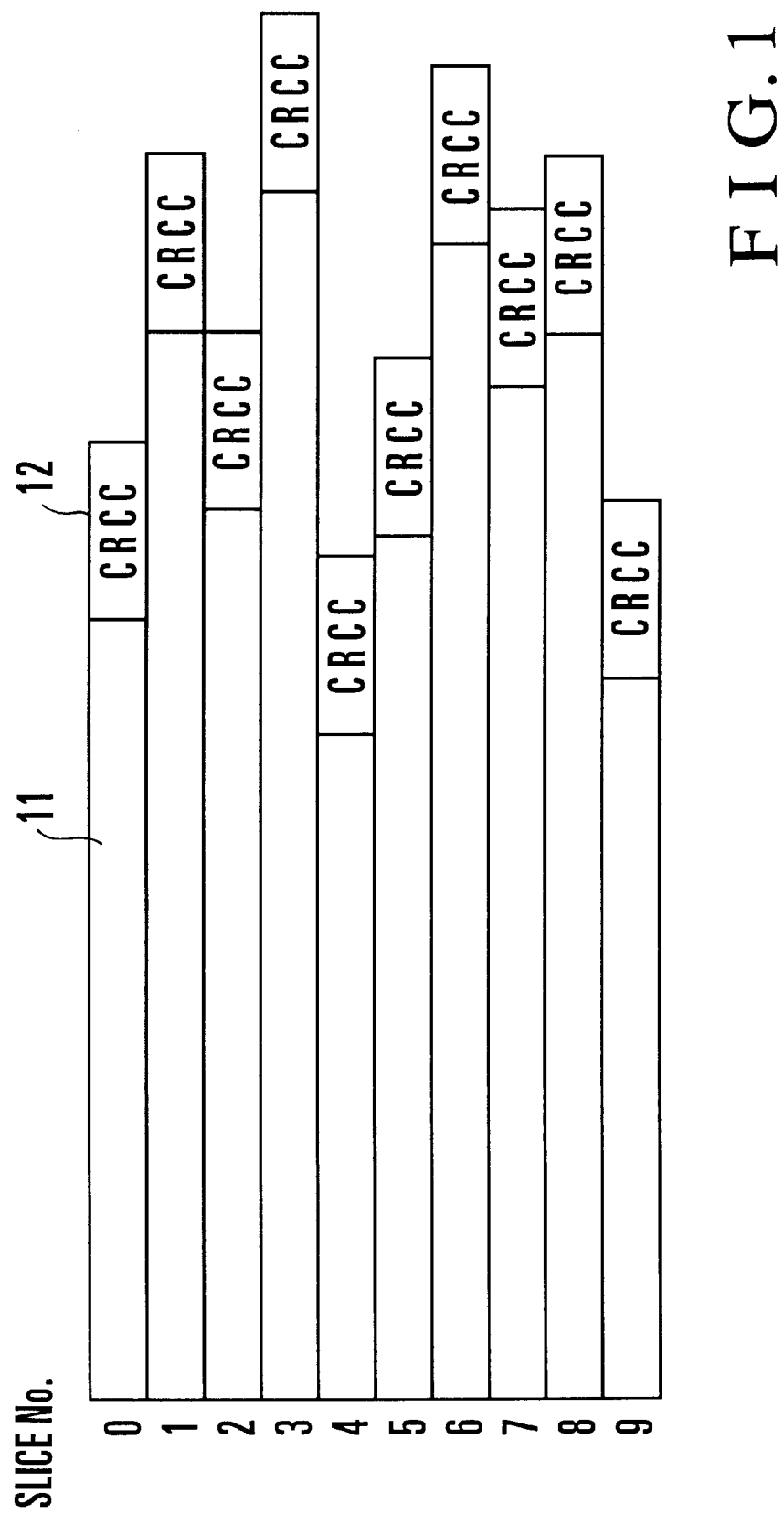
FIG. 1 is a view showing how a CRCC error detection code is added to each variable-length slice in the present invention.

FIG. 1 shows an example of how a CRCC error detection code is added to each variable-length slice.

Figure 14:
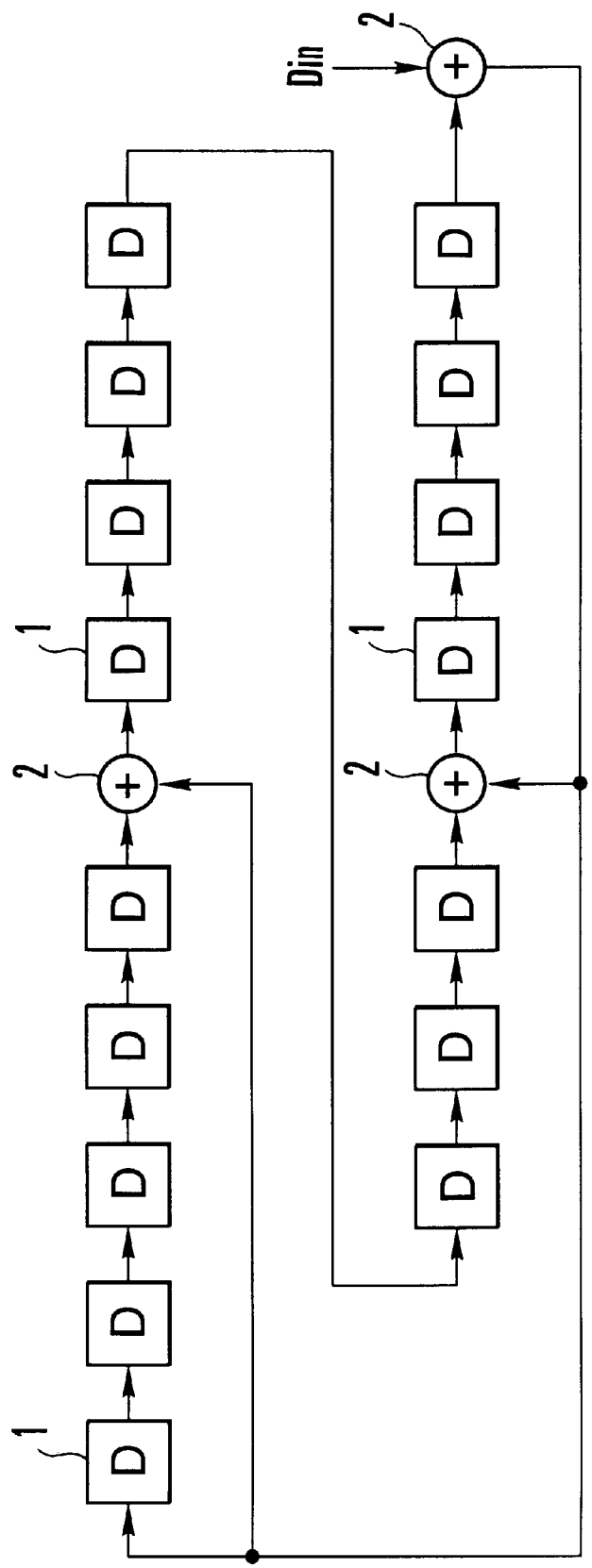
FIG. 14 is a block diagram showing a CRCC register.

In a recording system, when slice synchronization data is detected, a CRCC register shown in FIG. 14 is preset to a predetermined value. The slice synchronization data (not shown) is present at the head of each slice indicated by a slice number and is used to determine a slice boundary. Thereafter, input variable-length slice data 11 is input to the CRCC register. After the slice data 11 is completely input, the data left in the CRCC register is output as a CRCC 12. The output CRCC 12 is added to the slice data 11 in the horizontal direction.

In a reproducing system, similar to the recording system, when slice synchronization data is detected, the CRCC register shown in FIG. 14 is preset to a predetermined value. Thereafter, input variable-length slice data 11 is input to the CRCC register. After the slice data 11 is completely input, a CRCC 12 is input to the CRCC register. The OR (logical OR) of all the bits of the data left in the register is calculated. If the logical OR result is "0", the absence of an error is determined. If the logical OR result is "1", the presence of an error is determined.

Figure 2:
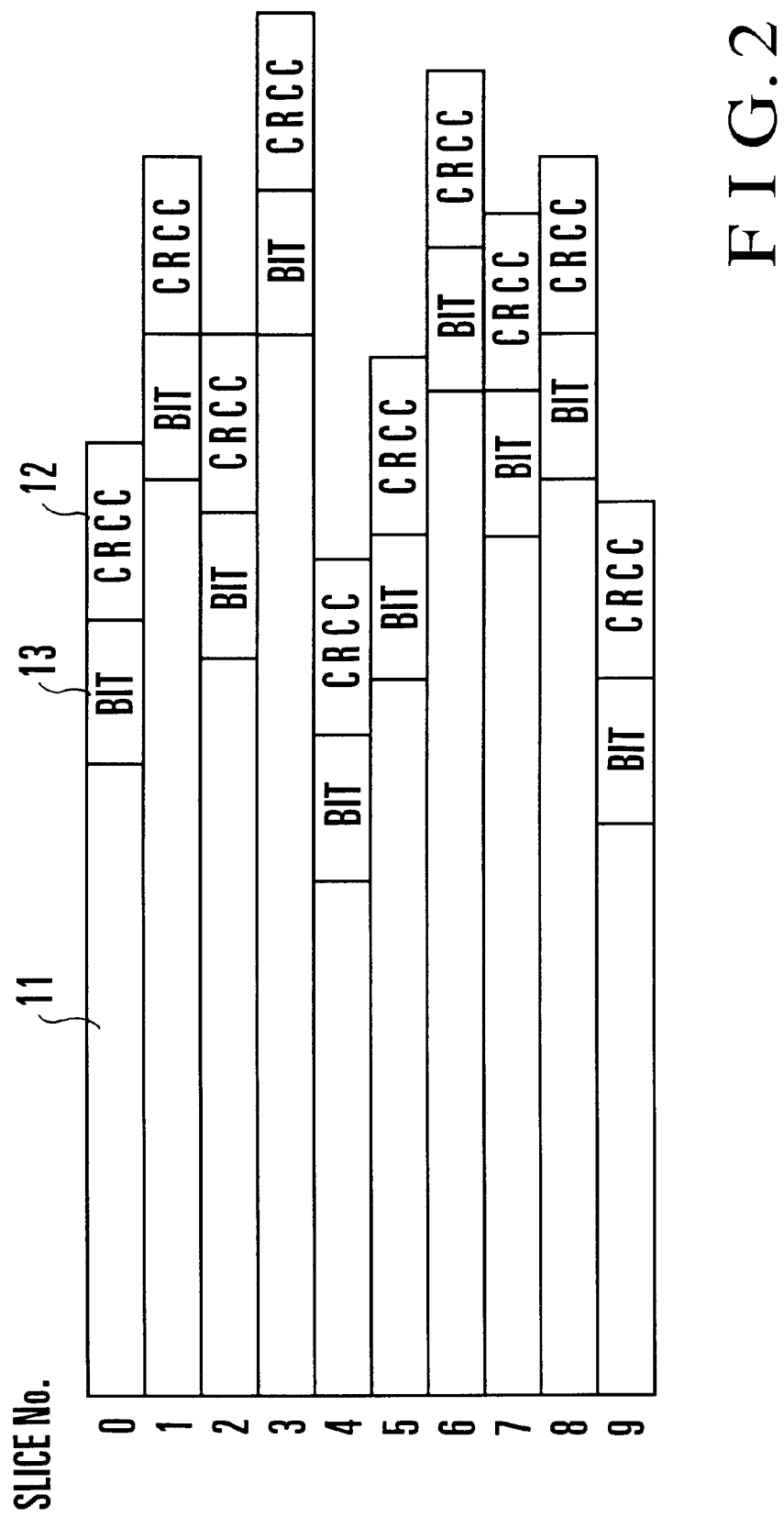
FIG. 2 is a view showing how a slice bit count and a CRCC error detection code are added to each variable-length slice in the present invention.

FIG. 2 shows an example of how a slice data bit count and a CRCC error detection code are added to each variable-length slice.

In the recording system, when slice synchronization data is detected, the CRCC register shown in FIG. 14 is preset to a predetermined value. Thereafter, input variable-length slice data 11 is input to the CRCC register, and the bits of the slice data 11 are counted. When the slice data is completely input, the counted number of bits of the slice data 11 is input to the CRCC register. Thereafter, the data left in the register is output as a CRCC 12. Data bit count 13 indicating the counted number of bits of the slice data 11 is added to the slice data 11, together with the CRCC 12, in the horizontal direction.

In the reproducing system, similar to the recording system, when slice synchronization data is detected, the CRCC register shown in FIG. 14 is preset to a predetermined value. Thereafter, input variable-length slice data 11 is input to the CRCC register, and the bits of the slice data 11 are counted. After the slice data 11 is completely input, reproduced data bit count 13 is input the CRCC register. Finally, a reproduced CRCC 12 is input to the CRCC register. All the bits of the data left in the CRCC register are then ORed. If the logical OR result is "0", and the counted number of bits of the slice data 11 coincides with the reproduced data bit count 13, the absence of an error is determined. If the logical OR result is "1", or the counted number of bits of the slice data 11 does not coincide with the data bit count 13, the presence of an error is determined.

Figure 3:
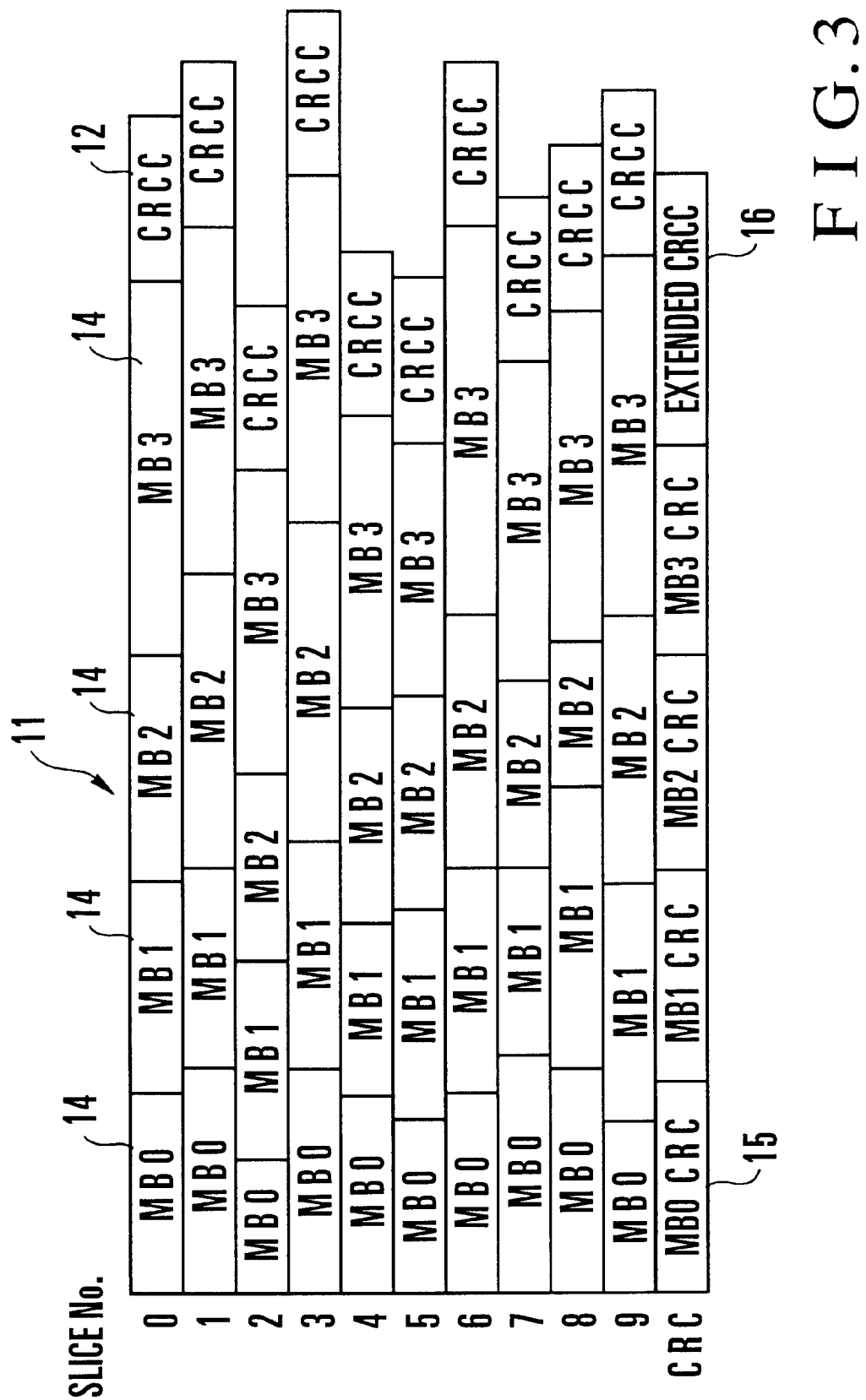
FIG. 3 is a view showing how CRCC error detection codes are added in units of variable-length slices in the vertical and horizontal directions in the present invention.

FIG. 3 shows an example of how CRCC error detection codes are added in units of variable-length slices in the vertical and horizontal directions.

In the recording system, when slice synchronization data is detected in the horizontal direction, the CRCC register is preset to a predetermined value. Thereafter, input variable-length slice data 11 is input to the CRCC register. After the slice data 11 is completely input, the data left in the register is output as a CRCC 12. The CRCC 12 is added to the slice data 11 in the horizontal direction.

The numbers of macroblocks 14 in the slices are detected in the vertical direction, and the macroblocks 14 having the same numbers are grouped. The CRCC register is then operated. After each macroblock group is completely input, the data left in the CRCC register is output as a CRCC 15.

Finally, a CRCC in the vertical direction (to be referred to as an "extended CRCC") 16 relative to the CRCC 12 in the vertical direction is output. The CRCC 15 and the extended CRCC 16 are added to the slice data 11 in the vertical direction.

The slice data 11 in the horizontal direction and the macroblock 14 in the vertical direction are variable-length data, whereas the CRCCs 12 in the horizontal direction and the CRCCs 15 in the vertical direction are fixed-length data.

In the reproducing system, first of all, an error in the horizontal direction is detected in units of slices. The CRCC register shown in FIG. 14 is preset to a predetermined value. Thereafter, input variable-length slice data 11 is input to the CRCC register. After the slice data 11 is completely input, a reproduced CRCC 12 is input to the CRCC register. The OR (logical OR) of all the bits of the data left in the CRCC register is calculated. If the logical OR result is "0", the absence of an error is determined. If the result is "1", the presence of an error determined.

Subsequently, an error in the vertical direction is detected in units of macroblock groups. The CRCC register shown in FIG. 14 is preset to a predetermined value. Thereafter, input variable-length macroblock group data is input to the CRCC register. After the macroblock group data is completely input, a reproduced CRCC 15 is input to the CRCC register. All the bits of the data left in the CRCC register are ORed. If the logical OR result is "0", the absence of an error is determined. If the result is "1", the presence of an error is determined.

With this manner of detecting errors in both the vertical and horizontal directions, a further improvement in detection performance can be expected. The processing in the vertical direction and that in the horizontal direction may be performed in reverse order.

Figure 4:
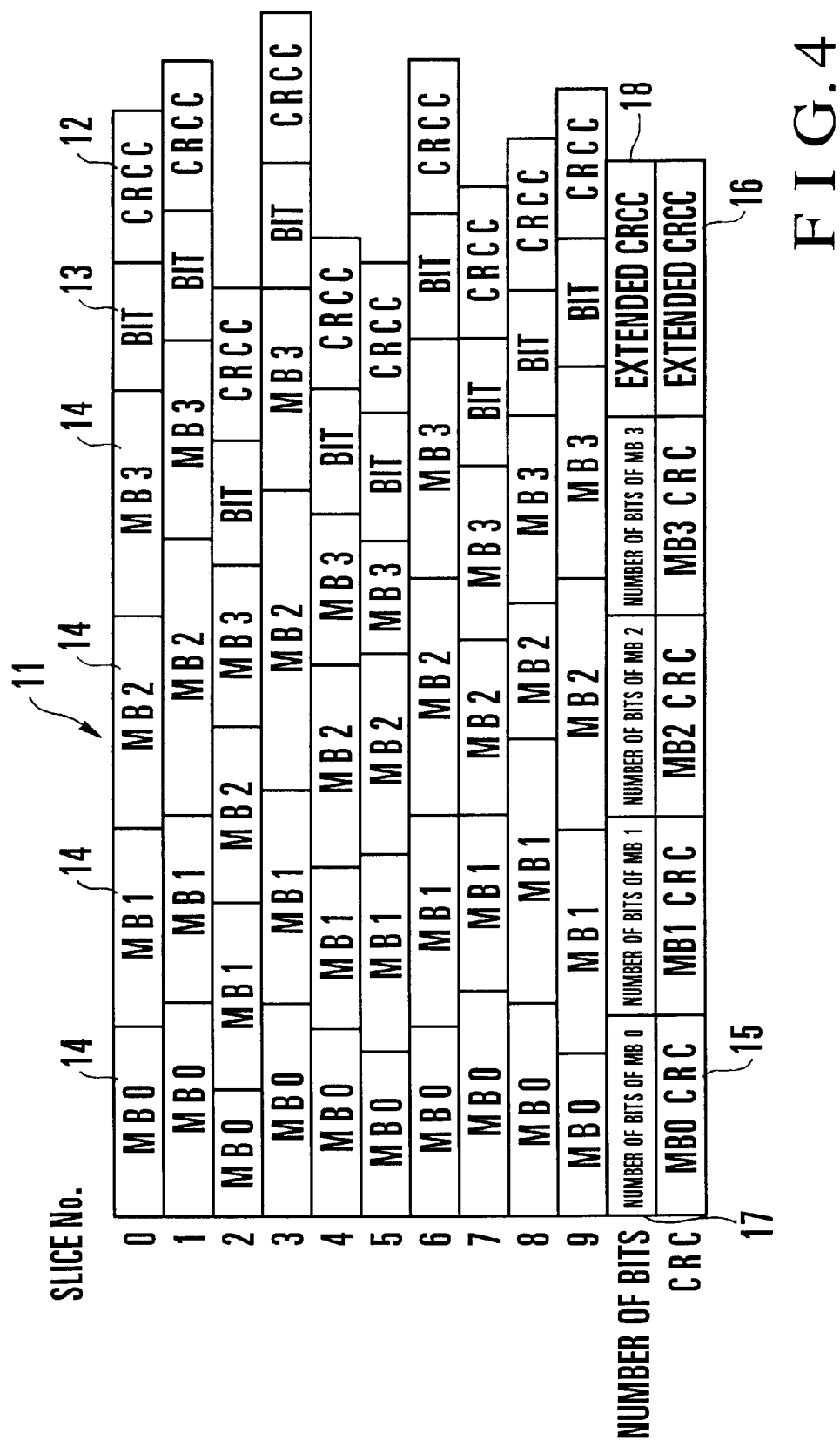
FIG. 4 is a view showing how slice bit counts and CRCC error detection codes are added in units of variable-length slices in the vertical and horizontal directions in the present invention.

FIG. 4 shows how data bit counts and CRCC error detection codes are added in units of variable-length slices in the vertical and horizontal directions.

In the recording system, when slice synchronization data is detected, the CRCC register shown in FIG. 14 is preset to a predetermined value. Input variable-length slice data 11 is input to the CRCC register, and the bits of the slice data 11 are counted. After the slice data 11 is completely input, the bit count of the slice data 11 is input to the CRCC register. The data left in the CRCC register is then output as a CRCC 12. A data bit count 13 indicating the counted number of bits of the slice data 11 is added to the slice data 11, together with a CRCC, in the horizontal direction.

In the vertical direction, the numbers of macroblocks 14 in the slices are detected, and the macroblocks 14 with the same numbers are grouped. The CRCC register is then operated, and the data bits of each macroblock group are counted. After each macroblock group data is completely input, the counted number of data bits is input to the CRCC register, and the data left in the CRCC register is output as a CRCC 15. A data bit count (a number of data bits) 17 of each macroblock group is added to the slice data 11, together with the CRCC 15, in the vertical direction.

Finally, an extended CRCC 18 (in the vertical direction) for the data bit counts 13 in the horizontal direction and an extended CRCC 16 (in the vertical direction) for the CRCCs 12 in the horizontal direction are output. The extended CRCCs 18 and 16 are added to the slice data 11 in the vertical direction.

The slice data 11 in the horizontal direction and the macroblock data 14 in the vertical direction are variable-length data, whereas the data bit counts 13 and the CRCCs 12 in the horizontal direction are fixed-length data. In a recording operation, all the MBs (macroblocks) corresponding to slice number 0, all the MBs corresponding to slice number 1, all the MBs corresponding to slice number 2, all the MBs corresponding to slice number 3, . . . , the data bit counts, and CRCCs are recorded in the order named.

In the reproducing system, first of all, an error is detected in unit of slices in the horizontal direction. The CRCC register shown in FIG. 14 is preset to a predetermined value. Thereafter, input variable-length slice data 11 is input to the CRCC register, and the bits of the slice data 11 are counted. After the slice data 11 is completely input, a reproduced data bit count 13 is input to the CRCC register. Finally, a reproduced CRCC 12 is input to the CRCC register. After the CRCC 12 is completely input, all the bits of the data left in the CRCC register are ORed. If the logical OR result is "0", and the counted number of bits of the slice data 11 coincides with the data bit count 13, the absence of an error is determined. If the logical OR result is "1" or the counted number of bits of the slice data 11 does not coincide with the data bit count 13, the presence of an error is determined.

Subsequently, an error in the vertical direction is detected in units of macroblock groups. The CRCC register shown in FIG. 14 is preset to a predetermined value. Thereafter, the data bits of each variable-length macroblock group are input to the CRCC register, and the bits of each macroblock group are counted. After the data bits of the macroblock group are completely input, a reproduced data bit count 17 is input to the CRCC register. Finally, a reproduced CRCC 15 is input to the CRCC register. After the CRCC is completely input, all the bits of the data left in the CRCC register are ORed. If the logical OR result is "0" and the counted data bit count coincides with the reproduced data bit count 17, the absence of an error is determined. If the logical OR result is "1" or the counted data bit count does not coincide with the reproduced data bit count 17, the presence of an error is determined.

With this manner of detecting errors in the both vertical and horizontal directions and detecting coincidence between bit counts, a further improvement in detection performance can be expected. The processing in the vertical direction and that in the horizontal direction may be performed in reverse order.

Referring to FIG. 4, when an error occurs in the slice data in one slice, the interpolation symbol can be minimized by determining the position of the error in units of macroblocks.

Figure 5:
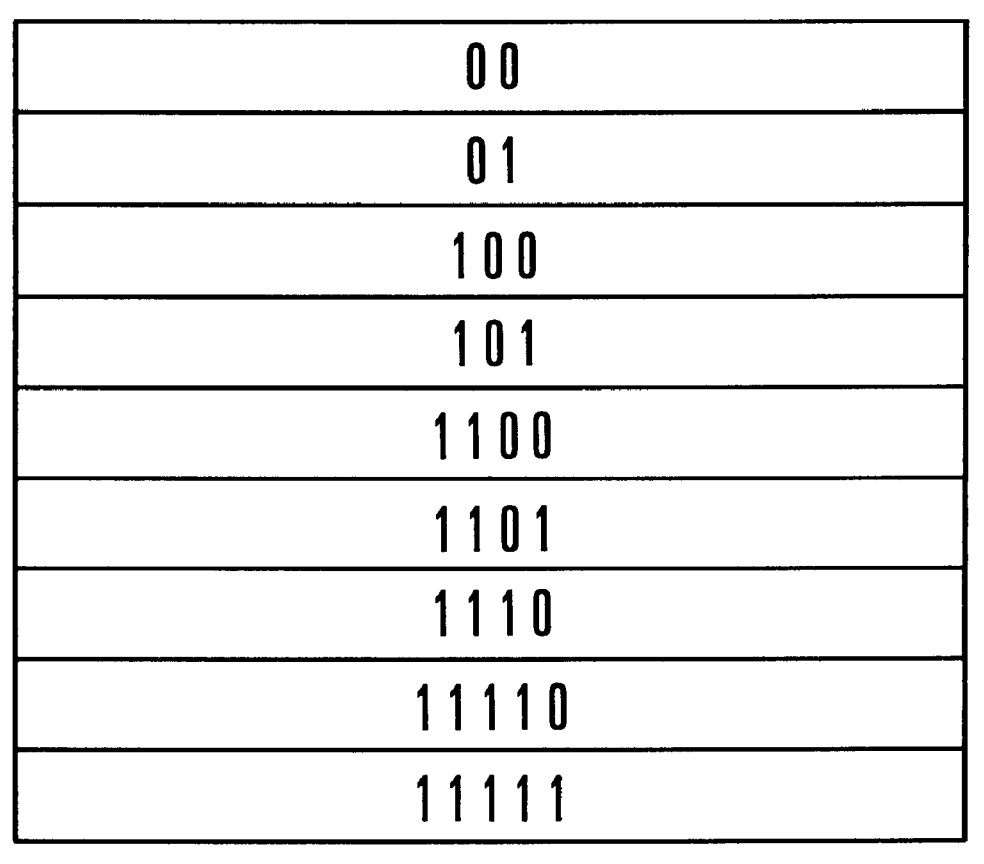

FIG. 5 shows variable-length codes.

Referring to FIG. 5, for example, nine types of codes "00", "01", "100", "101", "1100", "1101", "1110", "11110", and "11111" are used as variable-length codes for compressed data in units of macroblocks.

Figure 6:
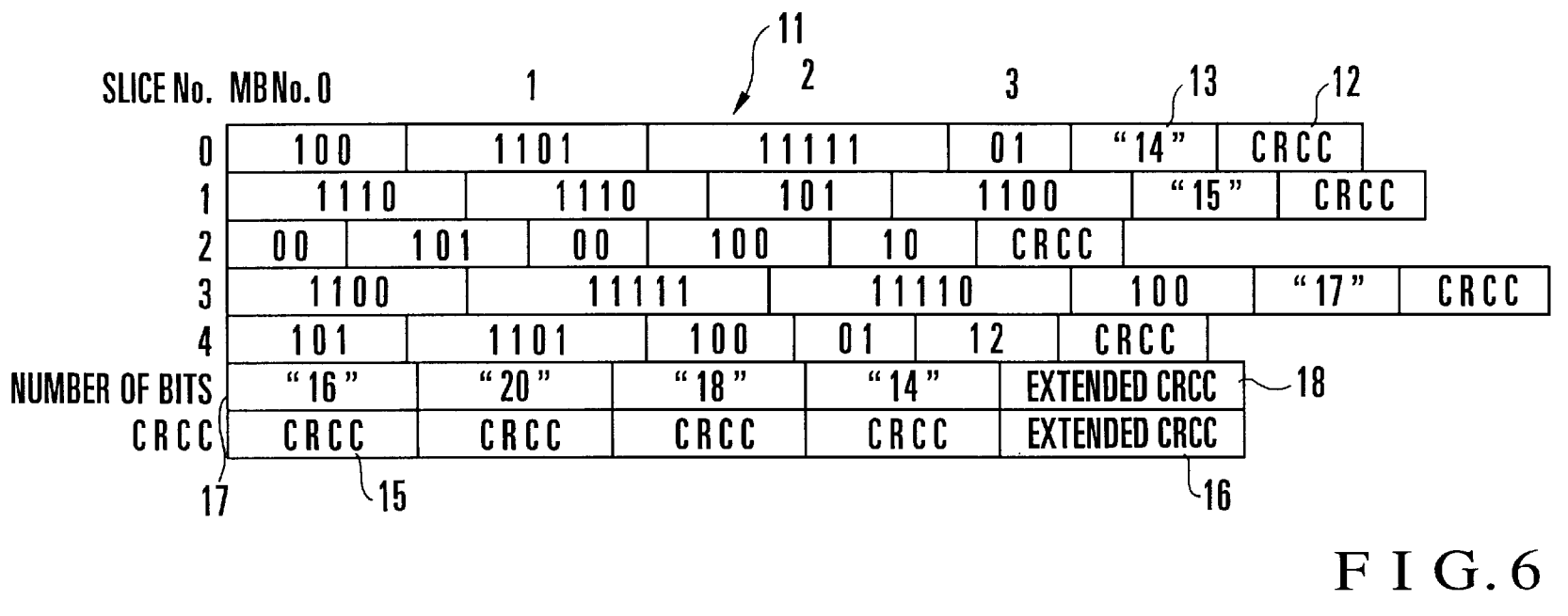

FIG. 6 shows macroblock variable-length codes corresponding to slice numbers (slice Nos.) and intra-slice macroblock numbers (MB Nos.).

Referring to FIG. 6, in the horizontal direction, after MB 0 to MB 3, a slice bit count (in the decimal notation) 13 and a slice CRCC 12 indicating a CRCC in the horizontal direction are arranged.

In the vertical direction, an MB bit count (the decimal notation) 17 and a CRCC 15 in the vertical direction are arranged in correspondence with slice 0 to slice 4 of MB 0; an MB bit count (the decimal notation) 17 and a CRCC 15 in the vertical direction are arranged in correspondence with slice 0 to slice 4 of MB 1; an MB bit count (the decimal notation) 17 and a CRCC 15 in the vertical direction are arranged in correspondence with slice 0 to slice 4 of MB 2; an MB bit count (the decimal notation) 17 and a CRCC 15 in the vertical direction are arranged in correspondence with slice 0 to slice 4 of MB 3; and an MB bit count (the decimal notation) 17 and a CRCC 15 in the vertical direction are arranged in correspondence with slice 0 to slice 4 of MB 4. Finally, an extended CRCC 18 for the slice bit counts and an extended CRCC 16 for the slice CRCCs are arranged.

FIG. 7 shows a case in which an error has occurred at the second bit of MB 0 of slice 1. If there is no error, as shown in FIG. 6, the data of MB 0 to MB 3 of slice 1 should be:

1110-1110-101-1100

However, since an error has occurred at the second bit of MB 0. as shown in FIG. 7, the data of MB 0 to MB 3 of slice 1 are determined as:

10-101-1101-01

In addition, since the data bit count is represented by a value starting from "1100", an error is determined.

Even if no error is determined in the data bit count by chance, an error occurs in the CRCC 12 of slice 1. No error occurs in the CRCCs in slice 0 and slice 2 to slice 4.

Error detection in the vertical direction is performed as follows. The data of slice 0 to slice 4 of the MB 0 group should be:

100-1110-00-1100-101-"16 (bits)"

The data are, however, determined as:

100-10-00-1100-101-"16 (bits)"

Errors therefore are determined in both the bit count 17 and the CRCC 15. That is, the bit count "14" obtained by actually counting the bits of the slice data 11 does not coincide with the bit count 17.

Consider slice 0 to slice 4 of the MB 1 group next. The data of this group should be:

1101-1110-101-11111-1101-"20 (bits)"

The data, however, become:

1101-101-101-11111-1101-"20 (bits)"

Since the actual bit count is "19", errors are determined in both the bit count 17 and the CRCC 15 in the vertical direction.

Consider slice 0 to slice 4 of the MB 2 group.

The data of this group should be:

11111-101-00-11110-100-"18 (bits)"

The data, however, become:

11111-1101-00-11110-100 "18 (bits)"

Since the actual bit count is "19", errors are determined in both the bit count 17 and the CRCC 15 in the vertical direction.

Consider slice 0 to slice 4 of the MB 3 group.

The data of this group should be:

01-1100-100-100-01-"14 (bits)"

The data, however, become:

01-01-100-100-01-"14 (bits)"

Since the actual bit count is "12", errors are determined in both the bit count 17 and the CRCC 15 in the vertical direction.

Consider error MB determination. Since an error has occurred in only slice 1 in the horizontal direction, the bit count of each MB of slice 1 can be determined from the data bit count in the vertical direction.

As is obvious, in the MB 0 group, since the overall bit count is 16, and the bit count of the group excluding slice 1 is 12, the bit count of slice 1 is 4.

Similarly, in the MB 1 group, since the overall bit count is 20, and the bit count of the group excluding slice 1 is 16, the bit count of slice 1 is 4.

In the MB 2 group, since the overall bit count is 18, and the bit count of the group excluding slice 1 is 15, the bit count of slice 1 is 3.

In the MB 3 group, since the overall bit count is 14, and the bit count of the group excluding slice 1 is 10, the bit count of slice 1 is 4.

In slice 1 in which the bit count of MB 0 is 4, the following data including an error is expected with respect to MB 0 to MB 3:

1010-1110-101-1100

The data of slice 1 is therefore replaced with the above data obtained by correcting the bit count of MB 0, and the data bit count 17 and the CRCC 15 are detected in the vertical direction. As a result, it is found that the data bit count 17 is correct but the CRCC 15 is incorrect in the MB 0 group, whereas both the bit count 17 and the CRCC 15 are correct in the MB 1–MB 3 group.

It is therefore determined at this point that an error exits in only MB 0 of slice 1 in which vertical and horizontal error flags intersect, and no error exists in the remaining macroblocks. It suffices if error interpolation is performed for only MB 0 of slice 1. That is, minimum error interpolation is required.

Error correction processing will be described next.

Figure 8:
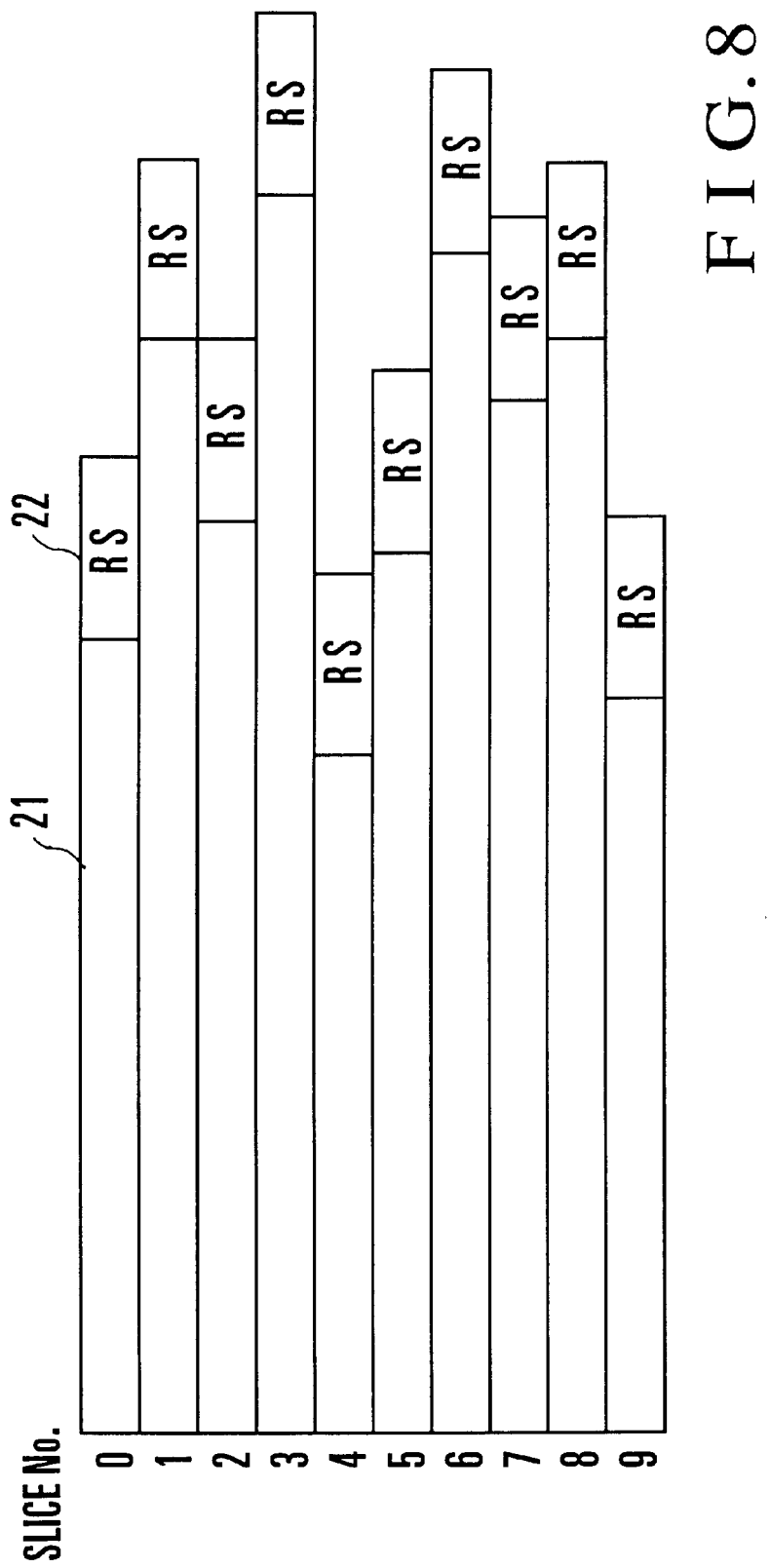
FIG. 8 is a view showing how an error correction code is added to each variable-length slice in the present invention.

FIG. 8 shows an example of how an error correction code is added to each variable-length slice. In this embodiment, a Reed-Solomon code (RS) is used as an error correction code.

In the recording system, when slice synchronization data is detected, a Reed-Solomon code generation register is preset to a predetermined value. Thereafter, input variable-length slice data 21 is delimited in units of, e.g., eight bits (symbol), and is input to the Reed-Solomon code generation register. After the slice data 21 is completely input, the data left in the register is output as a Reed-Solomon code 22. If the slice data 21 ends at a length shorter than 8 bits, the remaining bits are filled with "0"s or "1"s. That is, bit stuffing is performed.

In the reproducing system, when slice synchronization data is detected, a syndrome register is preset to a predetermined value. Thereafter, variable-length slice data 21 is input to the syndrome register, and the number of symbols of the slice data 21 is counted as a code length.

After the slice data 21 is completely input, the slice data 21 is input to the syndrome register, and the syndrome calculation and the code length counting are complete. Thereafter, error correction processing is performed on the basis of the syndrome and the code length. Since error correction itself is not directly associated with the gist of the present invention, a description of correction processing will be omitted.

After the correction processing, the reliability of the result is obtained. If "0" is obtained, the correction result is employed as a reliable result. If "1" is obtained, the correction result is determined as an unreliable result and hence is not employed. As a result, interpolation processing is performed.

Figure 9:
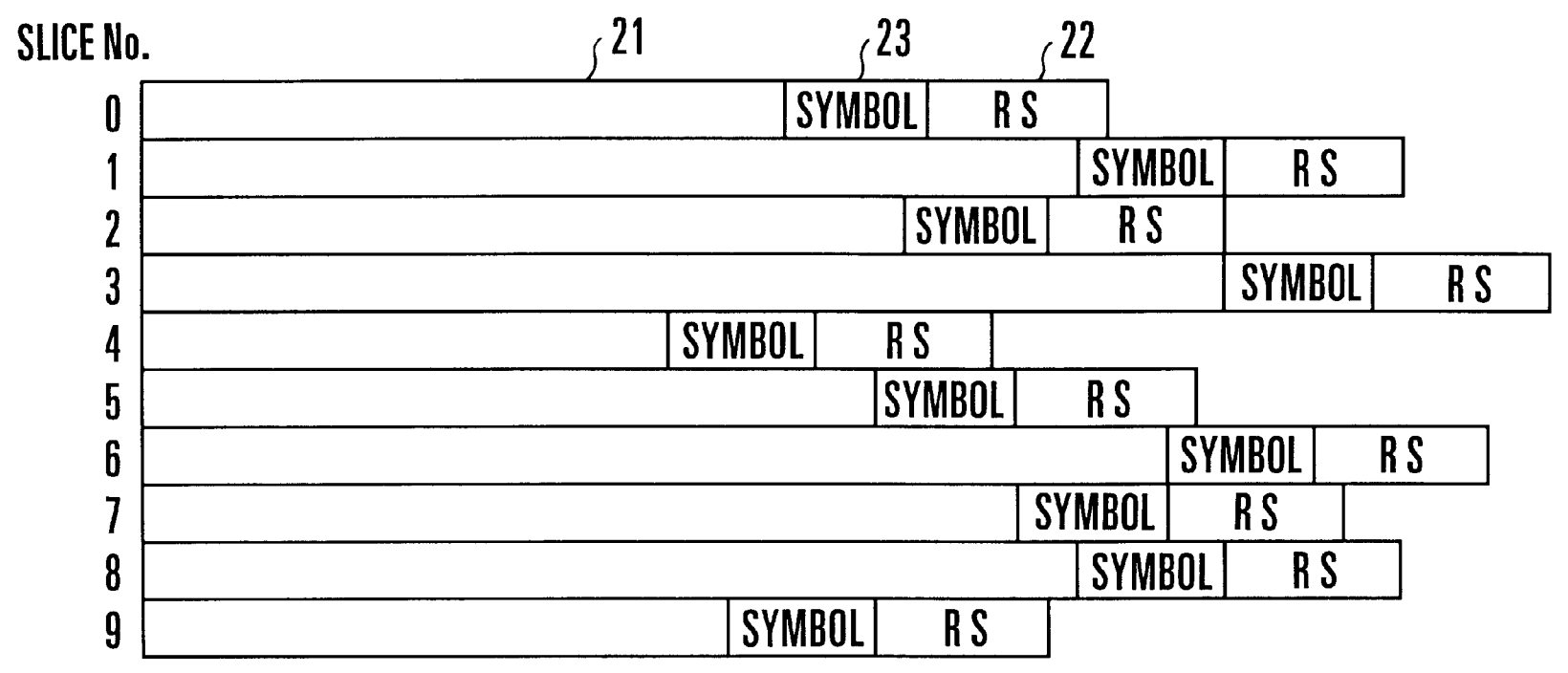

FIG. 9 shows an example of how a slice symbol count and an error correction code are added to each variable-length slice.

In the recording system, when slice synchronization data is detected, the Reed-Solomon code generation register is preset to a predetermined value. Thereafter, input variable-length slice data 21 is delimited in units of, e.g., eight bits (symbol), and is input to the Reed-Solomon code generation register. At the same time, the number of symbols of the slice data 21 is counted as a code length. After the slice data 21 is completely input, a symbol count 23 of the slice data 21 is input to the Reed-Solomon code generation register, and the data left in the register is output as a Reed-Solomon code 22.

In the reproducing system, similar to the recording system, when slice synchronization data is detected, the syndrome register is preset to a predetermined value. Thereafter, input variable-length slice data 21 is input to the syndrome register. After the slice data 21 is completely input, a reproduced slice data symbol count 23 is input to the syndrome register. Finally, a Reed-Solomon code 22 is input to the syndrome register, and the syndrome calculation and the code length input operation are complete.

Subsequently, error correction processing is performed on the basis of the syndrome and the code length. Since error correction itself is not directly associated with the gist of the present invention, a description of correction processing will be omitted.

After the correction processing, the reliability of the result is obtained. If "0" is obtained, the correction result is employed as a reliable result. If "1" is obtained, the correction result is determined as an unreliable result and hence is not employed. As a result, interpolation processing is performed.

Figure 10:
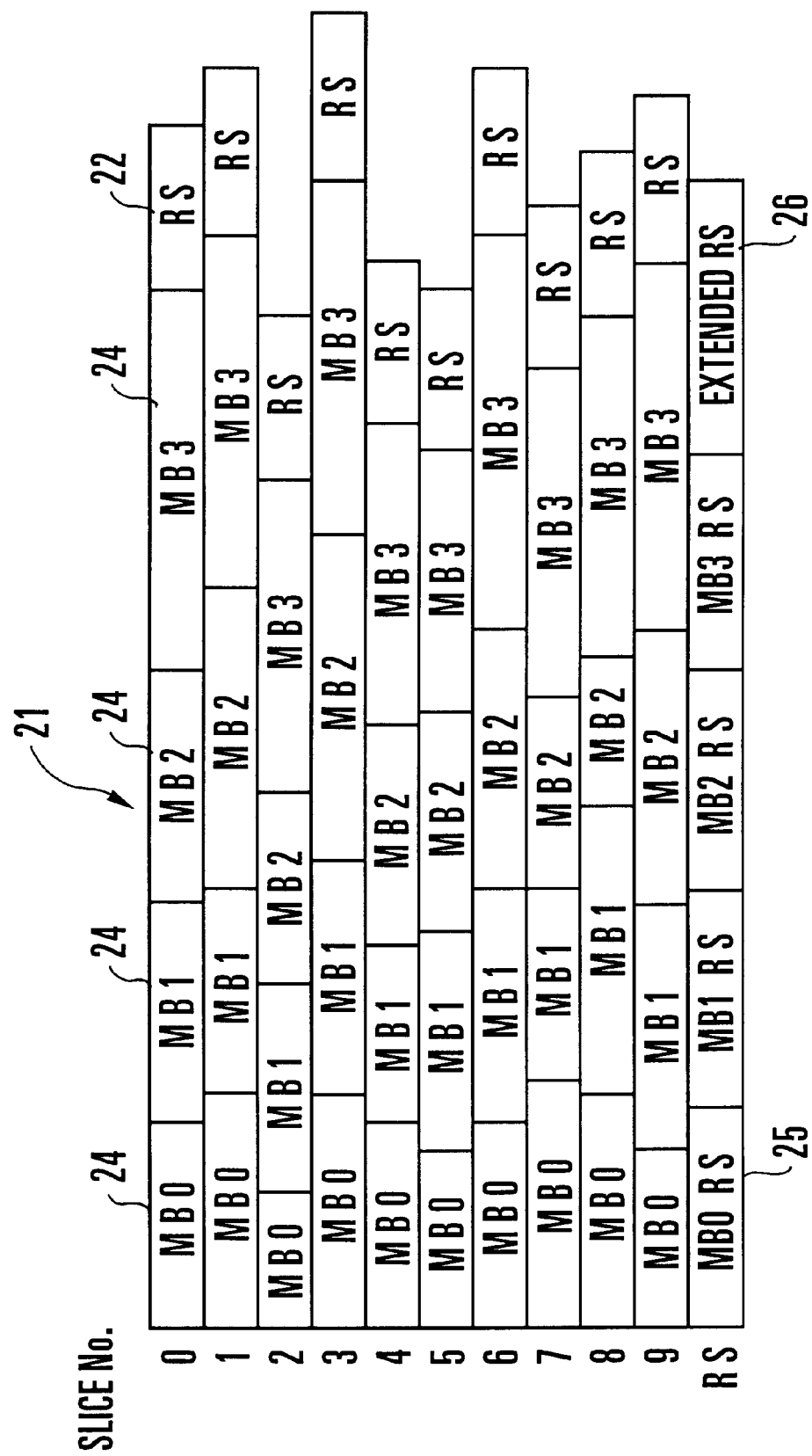
FIG. 10 is a view showing how error correction codes are added in units of variable-length slices in the vertical and horizontal directions in the present invention.

FIG. 10 shows an example of how error correction codes are added in units of variable-length slices in the vertical and horizontal directions.

In the recording system, when slice synchronization data is detected in the horizontal direction, the Reed-Solomon code generation register is preset to a predetermined value. Thereafter, input variable-length slice data 21 is delimited in units of, e.g., eight bits (symbol), and is input to the Reed-Solomon code generation register. After the slice data is completely input, the data left in the register is output as a Reed-Solomon code 22.

The numbers of macroblocks 24 in the slices are detected in the vertical direction, and the macroblocks 24 with the same numbers are grouped. Each group is then delimited in units of, e.g., eight bits (symbol), and the Reed-Solomon code generation register is operated. After each macroblock group is completely input, the data left in the register is output as a Reed-Solomon code 25. Finally, a Reed-Solomon code 26 for Reed-Solomon codes 22 in the horizontal direction is output.

The slice data 21 in the horizontal direction and the macroblocks 24 in the vertical direction are variable-length data, whereas the Reed-Solomon codes 22 in the horizontal direction and the Reed-Solomon codes 25 in the vertical direction are fixed-length data.

In the reproducing system, first of all, an error in the horizontal direction is corrected. The syndrome register is preset to a predetermined value. Thereafter, input variable-length slice data 21 is input to the syndrome register, and the number of symbols of the slice data 21 is counted as a code length.

When the slice data 21 is completely input, a reproduced Reed-Solomon code 22 is input to the syndrome register, and the syndrome calculation and the code length counting are complete. Thereafter, error correction processing is performed on the basis of the obtained syndrome and code length. Since error correction itself is not directly associated with the gist of the present invention, a description of correction processing will be omitted.

After the correction processing, the reliability of the result is obtained. If "0" is obtained, the correction result is employed as a reliable result. If "1" is obtained, the correction result is determined as an unreliable result and hence is not employed. As a result, interpolation processing is performed.

Subsequently, an error in the vertical direction is corrected. Similarly, the syndrome register is preset to a predetermined value. Thereafter, the data of input variable-length macroblocks 24 are input to the syndrome register, and the number of symbols of the data of the macroblocks 24 is counted as a code length. After the data of the macroblocks 24 are completely input, a Reed-Solomon code 25 is input to the syndrome register, and the syndrome calculation and the code length counting are complete. Thereafter, error correction processing is performed on the basis of the obtained syndrome and code length.

After the correction processing, the reliability of the result is obtained. If "0" is obtained, the correction result is employed as a reliable result. If "1" is obtained, the correction result is determined as an unreliable result and hence is not employed. As a result, interpolation processing is performed.

With this error correction in both the directions, a further improvement in correction performance can be expected. The processing in the vertical direction and that in the horizontal direction may be performed in reverse order.

FIG. 11 shows an example of how data symbol counts and error correction codes are added in units of variable-length slices in the vertical and horizontal directions.

In the recording system, when slice synchronization data is detected, the Reed-Solomon code generation register is preset to a predetermined value. Input variable-length slice data 21 is delimited in units of, e.g., eight bits, and is input to the Reed-Solomon code generation register. At the same time, the number of data symbols is counted. After the slice data 21 is completely input, a data symbol count 23 is input to the Reed-Solomon code generation register, and the data left in the register is output as a Reed-Solomon code 22.

The numbers of macroblocks 24 in the slices are detected in the vertical direction. The macroblocks 24 with the same numbers are grouped, and the register is operated. At this time, each macroblock group is delimited in units of, e.g., eight bits, and the number of data symbols is counted. After each macroblock group is completely input, a data symbol count (a number of data symbols) 27 is input to the Reed-Solomon code generation register, and the data left in the register is output as a Reed-Solomon code 25.

Finally, extended Reed-Solomon code codes 28 and 26 for the data symbol counts 23 and the Reed-Solomon codes 22 in the horizontal direction are output.

The slice data 21 in the horizontal direction and the data of the macroblocks 24 in the vertical direction are variable-length data, whereas the symbol counts 23 and the Reed-Solomon codes 22 in the horizontal direction are fixed-length data. In a recording operation, all the MBs of slice 0, all the MBs of slice 1, all the MBs of slice 2, all the MBs of slice 3, . . . , the data symbol counts, and the Reed-Solomon codes are sequentially recorded in the order named.

In the reproducing system, first of all, an error in the horizontal direction is corrected. The syndrome register is preset to a predetermined value. Thereafter, input variable-length slice data 21 is input to the syndrome register. When the slice data 21 is completely input, a reproduced slice data symbol count 23 is input to the syndrome register. Finally, a Reed-Solomon code 22 is input to the syndrome register, and the syndrome calculation and the code length input operation are complete.

Subsequently, error correction processing is performed on the basis of the obtained syndrome and code length. After the correction processing, the reliability of the result is obtained. If "0" is obtained, the correction result is employed as a reliable result. If "1" is obtained, the correction result is determined as an unreliable result and hence is not employed. As a result, interpolation processing is performed.

Subsequently, an error in the vertical direction is performed. Similarly, the syndrome is preset to a predetermined value. Thereafter, the data of input variable-length macroblocks 24 are input to the syndrome register. When the data of the macroblocks 24 are completely input, a reproduced data symbol count 27 is input to the syndrome register. Finally, a Reed-Solomon code 25 is input to the syndrome register, and the syndrome calculation and the code length input operation are complete.

Subsequently, error correction processing is performed on the basis of the obtained syndrome and code length. After the correction processing, the reliability of the result is obtained. If "0" is obtained, the correction result is employed as a reliable result. If "1" is obtained, the correction result is determined as an unreliable result and hence is not employed. As a result, interpolation processing is performed.

With this error correction in both the directions and detection of coincidence between the symbol counts, a further improvement in correction performance can be expected. The processing in the vertical direction and that in the horizontal direction may be performed in reverse order.

Referring to FIG. 11, when an error which cannot be corrected occurs in the slice data 21 in one slice, the interpolation symbol can be minimized by determining the position of the error in units of macroblocks.

FIG. 12 shows macroblock variable-length codes corresponding to slice numbers (slice Nos.) and intra-slice macroblock numbers (MB Nos.), using the variable-length codes in FIG. 5.

Referring to FIG. 12, in the horizontal direction, after MB 0 to MB 3, a slice symbol count (the decimal notation) 23 and a slice RS (Reed-Solomon code) 22 are arranged. In this case, one symbol consists of two bits for the sake of descriptive convenience. Bit stuffing is performed by inserting "0" as one bit in a slice having an odd number of bits to make it have an even number of bits, i.e., make it become a symbol unit. Note that this bit stuffing is performed to calculate an error correction code, and hence no bit needs to be actually inserted. If no bit is inserted, an error correction code is calculated assuming that bit stuffing has been performed. A symbol count in the horizontal direction need not be inserted.

In the vertical direction, an MB symbol count (the decimal notation) 27 and an RS 25 corresponding to slice 0 to slice 4 of the MB 0 group are arranged; an MB symbol count (the decimal notation) 27 and an RS 25 corresponding to slice 0 to slice 4 of the MB 1 group are arranged; an MB symbol count (the decimal notation) 27 and an RS 25 corresponding to slice 0 to slice 4 of the MB 2 group are arranged; and an MB symbol count (the decimal notation) 27 and an RS 25 corresponding to slice 0 to slice 4 of the MB 3 group are arranged. Finally, an extended RS 28 for the slice symbol counts 23 and an extended RS 26 for the slice RSs 22 are arranged.

In the case shown in FIG. 12, each bit count in the vertical direction is an even number. If, however, a bit count becomes an odd number, bit stuffing is performed in the horizontal direction in the same manner as described above by inserting "0" as one bit. This bit stuffing is performed to calculate an error correction code, and hence no bit needs to be actually inserted. In this case, an error correction code is calculated assuming that bit stuffing has been performed. In addition, each symbol count in the vertical direction must be expressed to also indicate a bit count.

In this case, one symbol consists of two bits. However, one symbol may consist of one bit, eight bits, or the like. In accordance with this setting, only the symbol count representation value changes.

FIG. 13 shows a case in which errors have occurred at the second and tenth bits of slice 1.

If there is no error, as shown in FIG. 12, the data of MB 0 to MB 3 of slice 1 should be:

1110-1110-101-1100

However, since errors have occurred at the second and tenth bits of slice 1, the data of MB 0 to MB 3 of slice 1 are determined as:

10-101-1101-11110-0

As a result, correction processing is performed. If the correction performance corresponds to one symbol, correction cannot be performed, and error flags are set. There is no error in the RSs of slice 0 and slice 2 to slice 4.

Error correction in the vertical direction is performed as follows. First of all, the data of slice 0 to slice 4 of the MB 0 group should be:

100-1110-00-1100-101-"8 (symbols)"

The data are, however, determined as:

100-10-00-1100-101-"8 (symbols)"

Errors are therefore determined in both the bit count 27 and the RS 25 in the vertical direction. That is, the actual symbol count is "7", which does not coincide with "8" indicated by the symbol count 27.

Consider slice 0 to slice 4 of the MB 1 group next. The data of this group should be:

1101-1110-101-11111-1101-"10 (symbols)"

The data, however, become:

1101-101-101-11111-1101-"10 (symbols)"

Errors are therefore determined in both the symbol count 27 and the RS 25 in the vertical direction.

Consider slice 0 to slice 4 of the MB 2 group next. The data of this group should be:

11111-101-00-11110-100-"9 (symbols)"

The data, however, become:

11111-1101-00-11110-100-"9 (symbols)"

Errors are therefore determined in both the symbol count 27 and the RS 25 in the vertical direction.

Consider slice 0 to slice 4 of the MB 3 group next. The data of this group should be:

01-1100-100-100-01-"17 (symbols)"

The data, however, become:

01-11110-100-100-01-"7 (symbols)"

Errors are therefore determined in both the symbol count 27 and the RS 25 in the vertical direction.

These errors are corrected if they can be corrected. If, however, an error cannot be corrected, the error MB is determined, and interpolation processing is performed.

Consider determination of an error macroblock (MB) when the error cannot be corrected. Since errors have occurred in only slice 1 in the horizontal direction, the symbol count of each MB of slice 1 can be determined from the data symbol count 27 in the vertical direction.

As is obvious, in the MB 0 group, since the overall symbol count of is 8, and the symbol count of the group excluding slice 1 is 6, the symbol count of slice 1 is 2.

Similarly, in the MB 1 group, since the overall symbol count is 10, and the symbol count of the group excluding slice 1 is 8, the symbol count of slice 1 is 2.

In the MB 2 group, since the overall symbol count is 9, and the symbol count of the group excluding slice 1 is 7.5, the symbol count of slice 1 is 1.5.

In the group of MB 3, since the overall symbol count is 7, and the symbol count of the group excluding the macroblock corresponding to slice 1 is 5, the symbol count of the macroblock corresponding to slice 1 is 2.

In slice 1 in which the symbol count of MB 0 is 2, the following data including an error is expected with respect to MB 0 to MB 3:

1010-1110-111-1100

The data of slice 1 is therefore replaced with the above data obtained by correcting the symbol count of MB 0, and the data symbol count 27 and the RS (Reed-Solomon code) 25 are detected in the vertical direction.

As a result, it is found that the data symbol count 27 is correct but the RS 25 is incorrect in the MB 0–MB 2 group, whereas both the symbol count 27 and the RS 25 are correct MB 1–MB 3 group.

It is therefore determined at this point that errors exit in only MB 0 and MB 2 of slice 1 in which vertical and horizontal error flags intersect, and no error exists in the remaining macroblocks. It suffices if error interpolation is performed for only MB 0 and MB 2 of slice 1. That is, minimum error interpolation is required.

Figure 15:
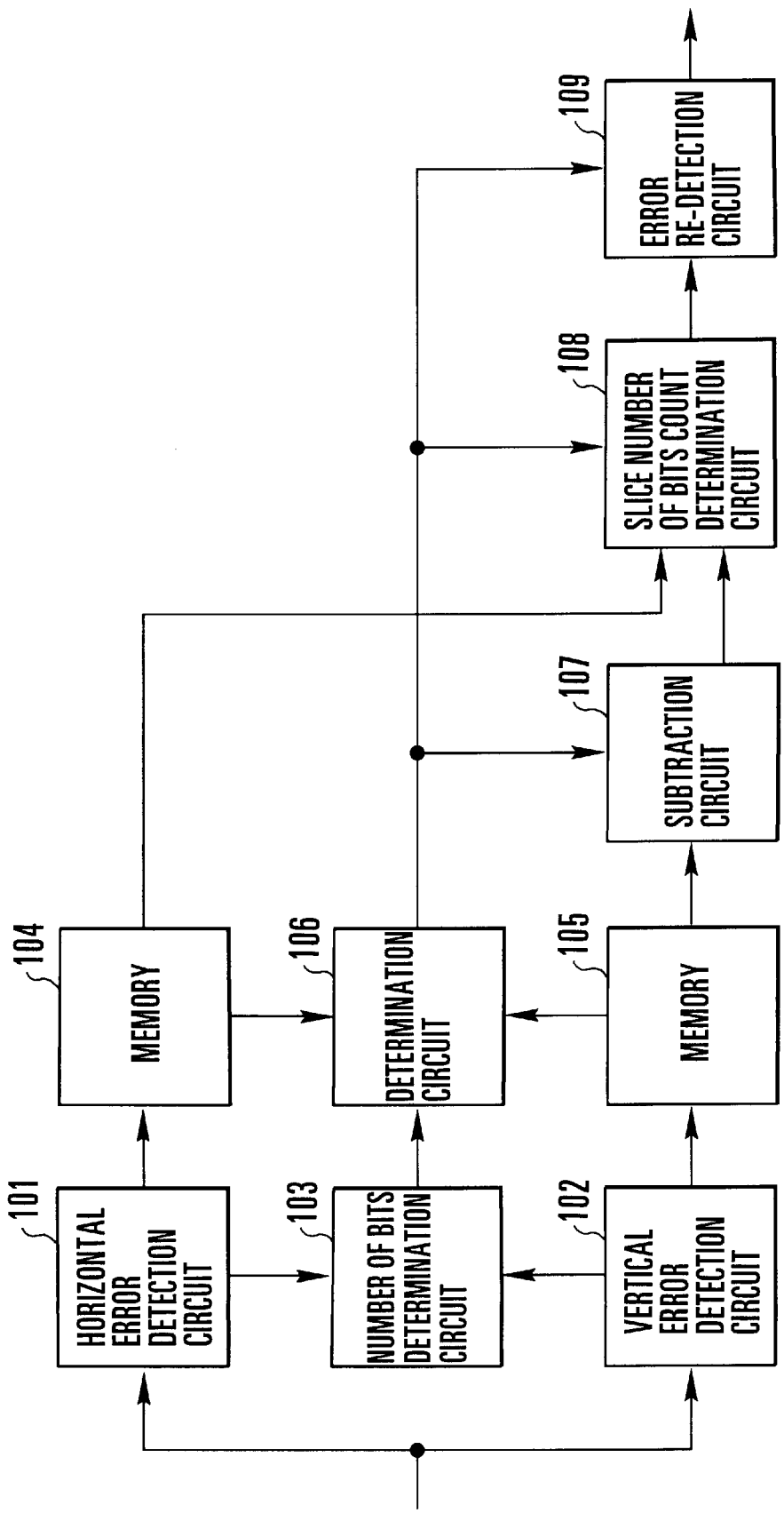
FIG. 15 is a block diagram showing a macroblock detection circuit according to the first embodiment of the present invention.

FIG. 15 shows an example of the arrangement of an error macroblock detection circuit (reproducing system) for realizing data (code) error detection in FIGS. 4, 6, and 7 according to the first embodiment of the present invention.

Referring to FIG. 15, a horizontal error detection circuit 101 and a vertical error detection circuit 102 detect errors in the horizontal and vertical directions. When a bit count determination circuit 103 determines the absence of an error in the bit count in the vertical direction, and a determination circuit 106 determines the presence of an error in one slice in the horizontal direction, a subtraction circuit 107 subtracts the bit count of slices, excluding the slice in which the error exits, from the bit count of the data in the vertical direction which is output from a memory 105. A slice bit count determination circuit 108 determines the data boundary of the slice having the error and output from a memory 104. An error re-detection circuit 109 performs CRCC error detection again in the vertical direction with respect to the slice data whose data boundary is corrected. The circuit 109 then determines the intersection between the above error slice and the determined error macroblock as a final error, and performs error interpolation.

Figure 16:
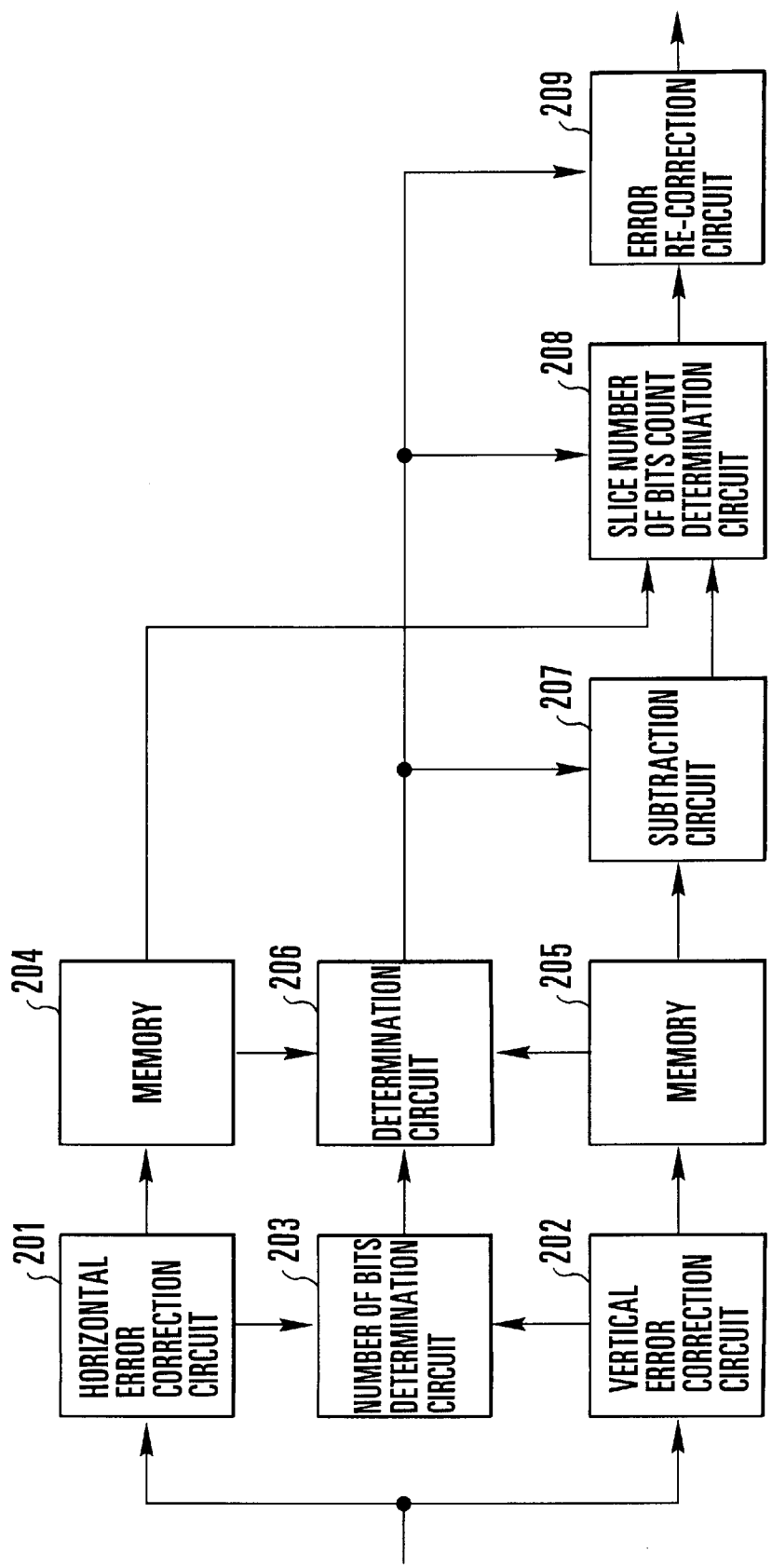
FIG. 16 is a block diagram showing a macroblock correction circuit according to the second embodiment of the present invention.

FIG. 16 shows an example of the arrangement of an error macroblock correction circuit (reproducing system) for realizing data (code) error correction in FIGS. 11, 12, and 13 according to the second embodiment of the present invention.

Referring to FIG. 16, a horizontal error correction circuit 201 and a vertical error correction circuit 202 detect/correct errors in the horizontal and vertical directions. When a bit count determination circuit 203 determines the absence of an error in the bit count in the vertical direction, and a determination circuit 205 determines the presence of an error which cannot be corrected in one slice in the horizontal direction, a subtraction circuit 207 subtracts the bit count of slices excluding the slice in which the error exists from the bit count of the data in the vertical direction which is output from a memory 205. A slice bit count determination circuit 208 determines the data boundary of the slice having the error and output from a memory 204. An error re-correction circuit 209 performs RS error correction again in the vertical direction with respect to the slice data whose data boundary is corrected. The circuit 209 then determines the intersection between the above error slice and the determined error macroblock as a final error, and performs error interpolation.

In each of the above embodiments, an error macroblock in an error slice is determined. As is obvious, however, the present invention can be applied to a case in which when no error exists in the bit counts in the horizontal direction, and an error exits in one macroblock group in the vertical direction, the error macroblock in the error macroblock group is determined to perform error interpolation.

In each embodiment described above, the present invention can be equally applied to video data having undergone shuffling processing in units of slices and video data having undergone shuffling processing in units of macroblocks.

Figure 17:
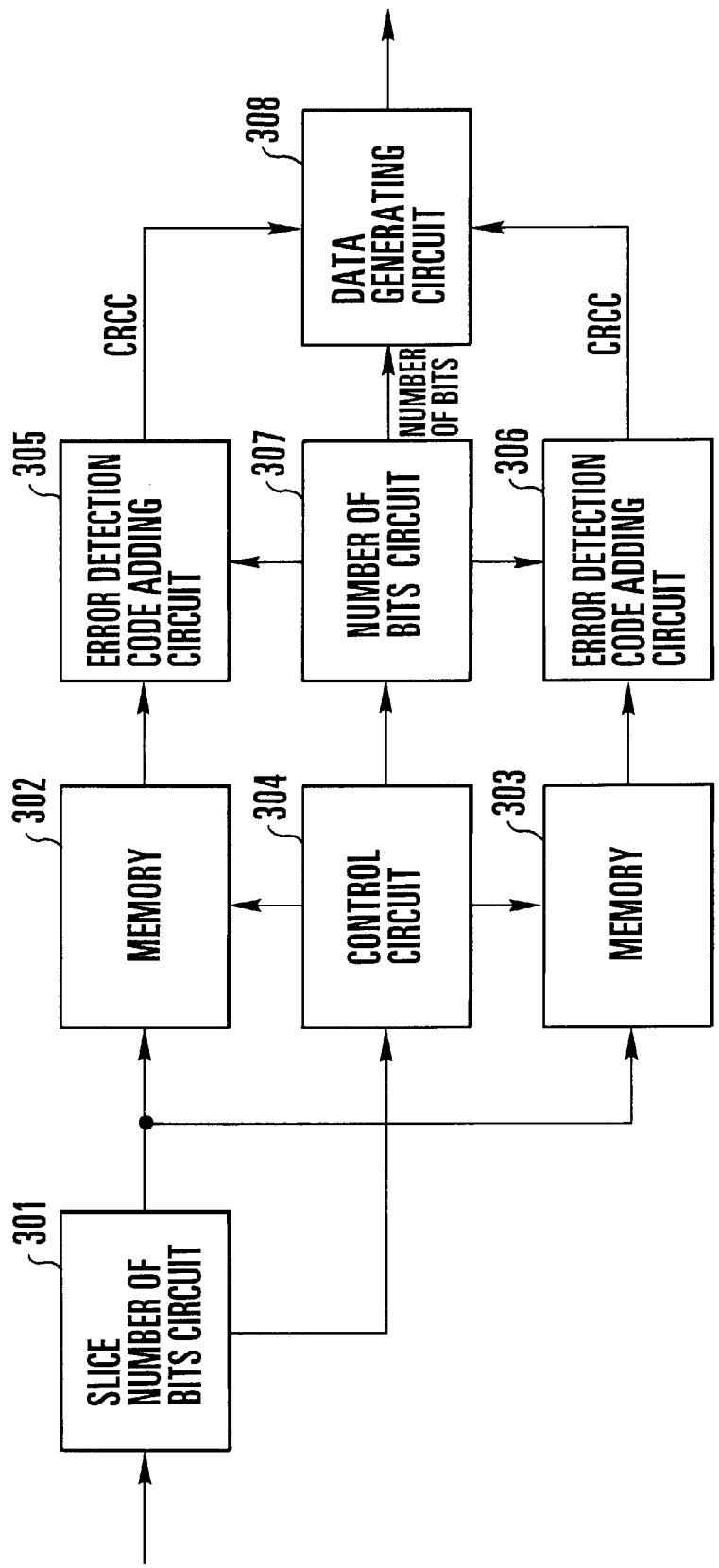
FIG. 17 is a block diagram showing a data generating circuit according to the third embodiment of the present invention.

FIG. 17 shows an example of the arrangement of a data generating circuit (recording system) for generating the data (code) in FIGS. 4, 6, and 7 according to the third embodiment of the present invention.

Referring to FIG. 17, a slice bit count circuit 301 counts the slice bits of input slice data which is delimited by slice synchronization data. A control circuit 304 records horizontal data and vertical data on memories 302 and 303, respectively, in accordance with the output from the slice bit count circuit 301. A bit count circuit 307 counts the number of bits in the horizontal direction and the number of bits in the vertical direction in accordance with the data respectively output from the memories 302 and 303. An error detection code adding circuit 305 obtains a CRCC in the horizontal direction on the basis of the horizontal bit count output from the bit count circuit 307 and the horizontal data from the memory 302. An error detection code adding circuit 306 obtains a CRCC in the vertical direction on the basis of the vertical bit count output from the bit count circuit 307 and the vertical data from the memory 303. A data generating circuit 308 generates variable-length data to which the CRCCs and the bit counts are added in accordance with the CRCCs in the horizontal and vertical directions, which are output from the error detection code adding circuits 305 and 306, and the bit counts in the horizontal and vertical directions, which are output from the bit count circuit 307.

As has been described above, according to the present invention, in the recording system, the error detection/correction code generating means generates an error detection/correction code for variable-length data. In the reproducing system, the error detection/correction means performs error detection/correction. Alternatively, in the recording system, the horizontal error detection/correction code generating means generates bit counts and error detection/correction codes in units of slices in the horizontal direction. The vertical error detection/correction code generating means groups macroblocks with the same macroblock numbers, which indicate the ordinal numbers of the respective macroblocks magnoblocks in the corresponding slices, in the vertical direction, and extracts the groups from one frame. The vertical error detection/correction code generating means then generates a bit count and an error detection/correction code in units of groups. In the reproducing system, the horizontal error detection/correction means can perform error detection/correction in units of macroblocks.

What is claimed is:

1. An error control device for detecting an error in a frame of variable length data, where, in said data,
a first horizontal number of pixels in a horizontal direction of said frame and a vertical number of lines in a vertical direction of said frame are grouped into one slice, and
a second horizontal number of pixels in the horizontal direction and said vertical number of lines constituting one slice in the vertical direction are grouped into one macroblock, so that one slice formed a plurality of macroblocks, said error control device comprising:
an error detection code generator which generates and adds an error detection code to said data, said error detection code generator having
a first code generator which generates a horizontal error detection code in units of slices in the horizontal direction, and
a second code generator which extracts macroblocks with the same ordinal number in respective slices, from one frame, and generates a vertical error detection code in units of macroblock groups, and
an error detector, disposed in a reproducing system and reproducing said data on the basis of said error detection code, said error detector having
a first detector which detects an error in units of slices in the horizontal direction, and
a second detector which detects an error in units of macroblock groups in the vertical direction.

2. A device according to claim 1, wherein:
said first code generator further generates a horizontal bit count, for each slice, in the horizontal direction,
said second code generator further generates a vertical bit count, for each macroblock group,
said first detector performs error detection in units of slices on the basis of the horizontal bit count and the horizontal error detection code, and
said second detector performs error detection in units of macroblock groups on the basis of the vertical bit count and the vertical error detection code.

3. A device according to claim 2, wherein said reproducing system comprises:
an error sequence count detector which, when errors are detected by said first and second detectors in an error macroblock and in an error slice, determines whether the errors exist in a sequence of macroblocks in the horizontal direction,
a bit count data detector which, when the errors exist in said sequence of macroblocks in the horizontal direction, determines whether errors exist in corresponding groups of macroblocks by referring to said vertical bit count in the vertical direction,
a bit count subtractor which, when no error exists in a particular vertical bit count in the vertical direction, sets a subtracted value obtained by subtracting a measured vertical bit count, which excludes a respective bit count of said error slice, from the particular vertical bit count in the vertical direction, said bit count subtractor sets said subtracted value as a corrected bit count of said error macroblock in said error slice, and
a bit assigner which assigns the corrected bit count obtained by said bit count subtractor to the error macroblock.

4. A device according to claim 2, wherein said reproducing system comprises:
an error sequence count detector which, when errors are detected by said first and second detector in an error macroblock and in an error slice, determines whether the errors exist in a sequence of slices in the vertical direction,
a bit count data detector which, when the errors exist in said sequence of slices in the vertical direction, determines whether errors exist in corresponding slices by referring to said horizontal bit count in the horizontal direction,
a bit count subtractor, which, when no error exist in a particular horizontal bit count in the horizontal direction, sets a subtracted value obtained by subtracting a measured horizontal bit count, which excludes a respective bit count of said error macroblock, from the said particular horizontal bit count in the horizontal direction, said bit count subtractor sets said subtracted value as a corrected bit count of said error macroblock, and a bit assigner which assigns said corrected bit count obtained by said bit count subtractor to the error macroblock.

5. A device according to claim 1, wherein said first detector performs error detection processing for video data having undergone a shuffling processing in units of slices.

6. A device according to claim 1, wherein said second detector performs error detection processing for video data having undergone a shuffling processing in units of macroblocks.

7. An error control device for detecting an error in a frame of variable length data having a synchronization signal, where, in said data, a first horizontal number of pixels in a horizontal direction of said frame and a vertical number of lines in a vertical direction of said frame are grouped into one slice, and a second horizontal number of pixels in the horizontal direction and said vertical number of lines constituting one slice in the vertical direction are grouped into one macroblock, so that one slice is formed by a plurality of macroblocks, said error control device comprising:

an error correction code generator which generates and adds an error correction code to said data, said error correction code generator including a first code generator which generates a horizontal error correction code in units of slices in the horizontal direction, and a second code generator which extracts macroblocks with the same ordinal numbers in respective slices, from one frame, and generates a vertical error correction code in units of macroblock groups, and an error corrector disposed in a reproducing system and which performs error correction on reproduced data on the basis of said error correction code, said error corrector having a first correction processor which corrects an error in units of slices in the horizontal direction, and a second correction processor which corrects an error in units of macroblock groups in the vertical direction.

8. A device according to claim 7, wherein said first code generator further generates one of a horizontal bit count and a horizontal symbol count in units of slices in the horizontal direction, said second code generator further generates one of a vertical bit count, and a vertical symbol count, for each macroblock group, said first correction processor performs error correction in units of slices on the basis of one of the horizontal bit count, the horizontal symbol count, and the horizontal error correction code, and said second correction processor performs error correction in units of macroblock groups on the basis of one of the vertical bit count, the vertical symbol count, and the vertical error correction code.

9. A device according to claim 8, wherein said reproducing system further comprises:

an error sequence count detector which, when errors are detected by said first and second processor in an error macroblock in an error slice, determines whether the errors exist in a sequence of macroblocks in the horizontal direction, a data count detector which, when the errors exist in said sequence of macroblocks in the horizontal direction, determines whether errors exist in corresponding groups of macroblocks by referring to said vertical bit count and said vertical symbol count in the vertical direction, a data subtractor which, when no error exists in one of a particular vertical bit count and a particular vertical symbol count in the vertical direction, sets a subtracted value obtained by subtracting one of a measured vertical bit count and a measured vertical symbol count, excluding respective bit count, and symbol count, of said error slices from one of said particular vertical bit count and said particular vertical symbol count in the vertical direction, said data subtractor sets said subtracted value as one of a corrected bit count and a corrected symbol count of said error macroblock in said error slice, and a data assigner which assigns one of the said corrected bit count and said corrected symbol count obtained by said data subtractor to the error macroblock.

10. A device according to claim 8, wherein said reproducing system further comprises:

an error sequence count detector which, when errors are detected by said first and second processor in an error macroblock in an error slice, determines whether the errors exist in a sequence of slices in the vertical direction, a data determinator which, when the errors exist in said sequence of slices in the vertical direction, determines whether errors exist in corresponding slices by referring to one of said horizontal bit count and said horizontal symbol count in the horizontal direction, a data subtractor which, when no error exists in one of a particular horizontal bit count and a particular horizontal symbol count in the horizontal direction, sets a subtracted value obtained by subtracting one of measured horizontal bit count and a measured horizontal symbol count, excluding respective bit counts and symbol counts of said error macroblock, from one of said particular horizontal bit count and said particular horizontal symbol count in the horizontal direction, said data subtractor sets said subtracted value as one of a corrected bit count and a corrected symbol count of said error macroblock, and a data assigner which assigns one of said corrected bit count and said corrected symbol count obtained by said data subtractor to said error macroblock.

11. A device according to claim 7, wherein said first correction processor performs error correction processing for video data having undergone a shuffling processing in units of slices.

12. A device according to claim 7, wherein said second processor performs error correction processing for video data having undergone a shuffling processing in units of macroblocks.

13. An error correction code generator which generates and adds an error correction code to variable length data, where in said data a first horizontal number of pixels in a horizontal direction of said frame and a vertical number of lines in a vertical direction of said frame are grouped into one slice, and a second horizontal number of pixels in the horizontal direction and said vertical number of lines constituting one slice in the vertical direction are grouped into one macroblock, so that one slice is formed by a plurality of macroblocks, said error correction code generator comprising:

a first code generator which generates a horizontal error correction code in units of slices in the horizontal direction, and a second code generator which extracts macroblocks with the same ordinal numbers in respective slices, from one frame, and generates a vertical error correction code in units of macroblock groups.

14. The error correction code generator as claimed in claim 13 wherein said first code generator further generates one of a horizontal bit count and a horizontal symbol count in units of slices in the horizontal direction, and said second code generator further generates one of a vertical bit count, and a vertical symbol count, for each macroblock group.

15. An error corrector disposed in a reproducing system which performs error correction on reproduced variable length data on the basis of an error correction code, where, in said reproduced data, a first horizontal number of pixels in a horizontal direction of said frame and a vertical number of lines in a vertical direction of said frame are grouped into one slice, and a second horizontal number of pixels in the horizontal direction and said vertical number of lines constituting one slice in the vertical direction are grouped into one macroblock, so that one slice is formed by a plurality of macroblocks, said error corrector comprising:

a first correction processor which corrects an error in units of slices in the horizontal direction, and a second correction processor which corrects an error in units of macroblock groups in the vertical direction.

16. The error corrector as claimed in claim 15 wherein:

said first correction processor performs error correction in units of slices on the basis of one of a horizontal bit count, a horizontal symbol count, and a horizontal error correction code, and said second correction processor performs error correction in units of macroblock groups on the basis of one of a vertical bit count, a vertical symbol count, and a vertical error correction code.

17. The error corrector as claimed in claim 16 further comprising:

an error sequence count detector which, when an error is detected by said first and second processor in an error macroblock in an error slice, determines whether said error exists in a sequence of macroblocks in the horizontal direction, a data count detector which, when said error exists in said sequence of macroblocks in the horizontal direction, determines whether errors exist in corresponding groups of macroblocks by referring to said vertical bit count and said vertical symbol count in the vertical direction, a data subtractor which, when no error exists in one of a particular vertical bit count and a particular vertical symbol count in the vertical direction, sets a subtracted value obtained by subtracting one of a measured vertical bit count and a measured vertical symbol count, excluding respective bit counts and symbol counts of said error slice, from one of said particular vertical bit count and said particular vertical symbol count in the vertical direction, said data subtractor sets said subtracted value as one of a corrected bit count and a corrected symbol count of said error macroblock in said error slice, and a data assigner which assigns one of the said corrected bit count and said corrected symbol count obtained by said data subtractor to the error macroblock.

18. A device according to claim 16, wherein said reproducing system further comprises:

an error sequence count detector which, when an error is detected by said first and second processor in an error macroblock in an error slice, determines whether said error exists in a sequence of slices in the vertical direction, a data determinator which, when said error exists in said sequence of slices in the vertical direction, determines whether an error exists in corresponding slices by referring to one of said horizontal bit count and said horizontal symbol count in the horizontal direction, a data subtractor which, when no error exists in one of a particular horizontal bit count and a particular horizontal symbol count in the horizontal direction, sets a subtracted value obtained by subtracting one of measured horizontal bit count and a measured horizontal symbol count, excluding respective bit counts and symbol counts of said error macroblock, from one of said particular horizontal bit count and said particular horizontal symbol count in the horizontal direction, said data subtractor sets said subtracted value as one of a corrected bit count and a corrected symbol count of said error macroblock, and a data assigner which assigns one of said corrected bit count and said corrected symbol count obtained by said data subtractor to said error macroblock.

* * * * *